United States Patent
Katayama et al.

(10) Patent No.: US 7,542,589 B2
(45) Date of Patent: Jun. 2, 2009

(54) ROAD POSITION DETECTION

(75) Inventors: Osamu Katayama, Nagoya (JP);
Hiroshi Uesugi, Nagoya (JP); Tadashi Kamada, Nagoya (JP); Takafumi Ito, Toyota (JP); Minoru Okada, Kitakyushu (JP)

(73) Assignees: Denso Corporation, Kariya (JP); Minoru Okada, Kitakyushu (JP)

( * ) Notice: Subject to any disclaimer, the term of this patent is extended or adjusted under 35 U.S.C. 154(b) by 636 days.

(21) Appl. No.: 10/895,964

(22) Filed: Jul. 22, 2004

(65) Prior Publication Data

US 2005/0031168 A1 Feb. 10, 2005

(30) Foreign Application Priority Data

Aug. 4, 2003 (JP) ............... 2003-286036

(51) Int. Cl.
*G06K 9/00* (2006.01)
(52) U.S. Cl. .................... 382/106; 382/104
(58) Field of Classification Search ............. 348/113; 382/104, 199, 269; 701/1, 300
See application file for complete search history.

(56) References Cited

U.S. PATENT DOCUMENTS

| 5,832,116 | A | | 11/1998 | Rezzouk .................. 382/199 |
| 5,922,036 | A | * | 7/1999 | Yasui et al. .................. 701/28 |
| 5,957,983 | A | * | 9/1999 | Tominaga ................... 701/23 |
| 6,449,383 | B1 | * | 9/2002 | Oike et al. .................. 382/104 |
| 7,218,758 | B2 | * | 5/2007 | Ishii et al. .................. 382/104 |

FOREIGN PATENT DOCUMENTS

| JP | A-6-243254 | | 9/1994 |
| JP | A-6-282650 | | 10/1994 |
| JP | A-8-167023 | | 6/1996 |
| JP | 411014346 | A * | 1/1999 |
| JP | 2002-049922 | A * | 2/2000 |
| JP | A-2001-143084 | | 5/2001 |
| JP | A-2002-49922 | | 2/2002 |

OTHER PUBLICATIONS

Notice of Reason for Rejection from Japanese Patent Office issued on Dec. 5, 2006 for the corresponding Japanese patent application No. 2003-286036 (a copy and English translation thereof).
Yasushi Yagi, et al., "Active Contour Road Model for Road Tracking and 3D Road Shape Reconstruction," Transaction of the Institute of Electronics, Information and Communication Engineers, pp. 1597-1607, vol. J84-D-11 No. 8, Aug. 2001.

* cited by examiner

*Primary Examiner*—Jingge Wu
*Assistant Examiner*—Amara Abdi
(74) *Attorney, Agent, or Firm*—Posz Law Group, PLC

(57) ABSTRACT

A dynamic contour extracting means detects, using a dynamic contour extraction method generally known as SNAKE, a contour of a recognition object included on an image by the following steps: a curve with control points is disposed in an image; an internal energy Eint indicating smoothness of the curve, an image energy Eimage, and an external energy Eext are summed up; and the curve is modified so that the summed total energy becomes the minimum. Here, a template is stored for including disposition information of primary control points that are bound to be moved only in a vertical or horizontal direction based on a road shape. The dynamic contour extracting means moves the primary control points based on the template. The primary control points can be rapidly moved owing to their limited movement direction.

19 Claims, 6 Drawing Sheets

ROAD POSITION DETECTION

CROSS REFERENCE TO RELATED APPLICATIONS

This application is based on and incorporates herein by reference Japanese Patent Application No. 2003-286036 filed on Aug. 4, 2003.

FIELD OF THE INVENTION

The present invention relates to detection of a road position included in an image.

BACKGROUND OF THE INVENTION

An image recognition device recently increases in need for recognizing, e.g., in a lane keep system, a road position from an image taken by an in-vehicle camera. The image recognition device imports an image from an in-vehicle camera into a memory and processes the imported image with respect to the respective pixels, thereby detecting (or recognizing) a road position. However, processing with respect to the respective pixels needs a long period for detecting the road position, so that a high-speed detection for the road position is hardly achieved.

A dynamic contour extraction method of extracting a contour of a specific recognition object included in an image is therefore proposed in use for detecting the road position. The dynamic contour extraction method includes known SNAKE, where a curve with control points is disposed in an image; an internal energy Eint indicating smoothness of the curve, an image energy Eimage, and an external energy Eext are summed up; the curve is modified so that the summed total energy becomes the minimum; and the contour of the recognition object included in the image is thereby detected (refer to JP-2002-049922 A).

An application of SNAKE to road recognition is shown in FIG. 6. Here, a dynamic contour model is formed of two curves (straight lines in FIG. 6) with control points shown as closed circles (●) in FIG. 6. The control points are moved and converged for detecting the road position in such a manner that the respective curves of the contour model approach from the inside to left and right road boundaries to thereby minimize the total energy (refer to "Active contour road model for road tracking and 3D road shape reconstruction" by Yasushi YAGI and other three persons, Transaction of the Institute of Electronics, Information and Communication Engineers, p. 1597-1607, Vol. J84-D-II No. 8, August 2001).

However, the above method cannot detect a road position from an image of the scene where crossroads or a left or right turn lane exists ahead of the camera, as described by the authors. Additionally, SNAKE can generally extract a contour of a recognition object in an image only using a closed curve (or closed curved surface).

SUMMARY OF THE INVENTION

It is an object of the present invention to provide a method and device for accurately, rapidly detecting a road position included in an image.

To achieve the above object, a road position included in an image is detected as follows. A curve with control points is disposed on the image. An internal energy indicating smoothness of the curve, an image energy indicating a concentration gradient of the image, and an external energy externally coming are summed up so as to obtain a total energy. The curve is modified by moving the control points so that the obtained total energy becomes a minimum. The road position included in the image is detected by extracting a contour of a recognition object included in the image. Here, the control points include primary control points, each of which is bound to be moved only in a direction based on a road shape, and secondary control points that are other than the primary control points.

Under the above structure of the present invention, primary control points that are strictly bound to be moved in an only vertical or horizontal direction are provided within the control points included in the template. The primary control points are moved according to the restricted directions; and in movement of the control points using SNAKE the primary control points can be determined in their positions at a high speed. Further, a template stores data based on a road shape, so that a road position is more properly detected than conventional. Furthermore, this method can extract a contour even in an open curve (or open curved surface), unlike known SNAKE.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
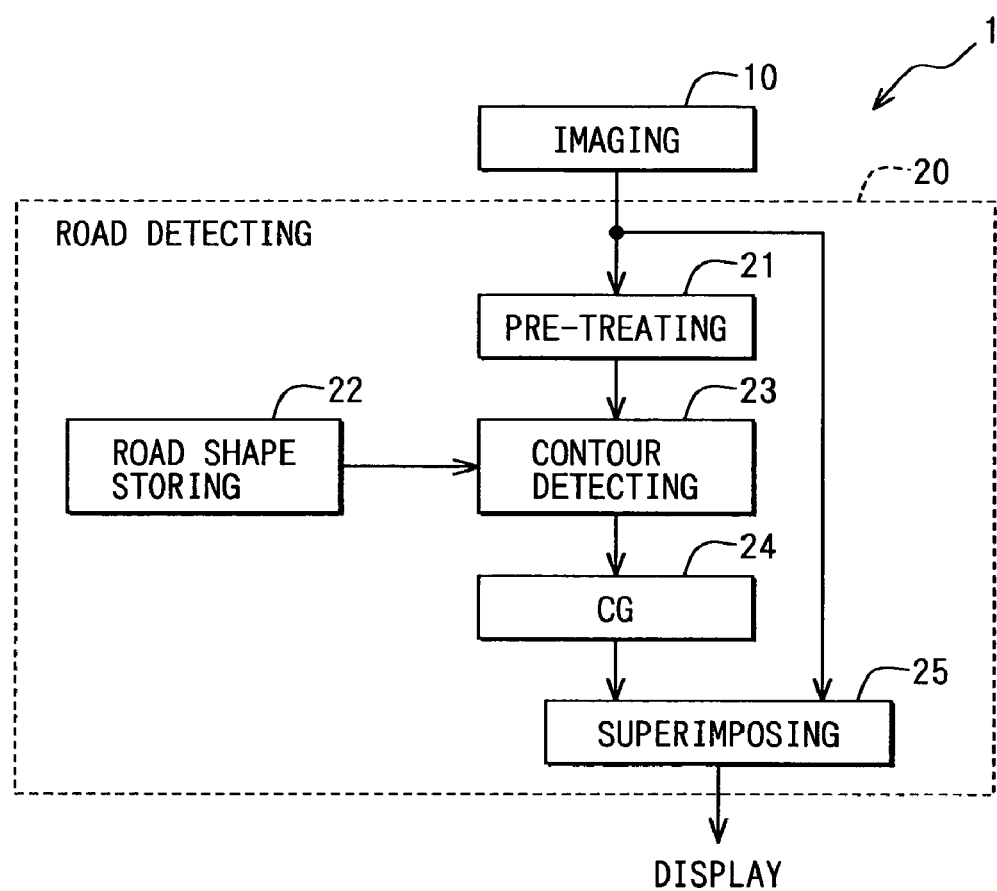
FIG. 1 is a block diagram showing a structure of an image processing device according to an embodiment of the present invention.

An image processing device will be explained as an embodiment of the present invention below. An image processing device 1 is mounted in a vehicle and includes an imaging means 10 and a road detecting means 20 that further includes a pre-treating means 21, a road shape storing means 22, a dynamic contour extracting means 23, a CG (computer graphics) means 24, and a superimposing means 25.

In the image processing device 1, the imaging means 10 takes an image; the road detecting means 20 detects a road position included in the image taken; computer graphics indicating the road position detected are superimposed on the image taken by the imaging means 10; and the image and the computer graphics superimposed are displayed on a display (not shown, e.g., liquid crystal display). Here, the display can include a display of a navigation system mounted in the vehicle.

Figure 4A:
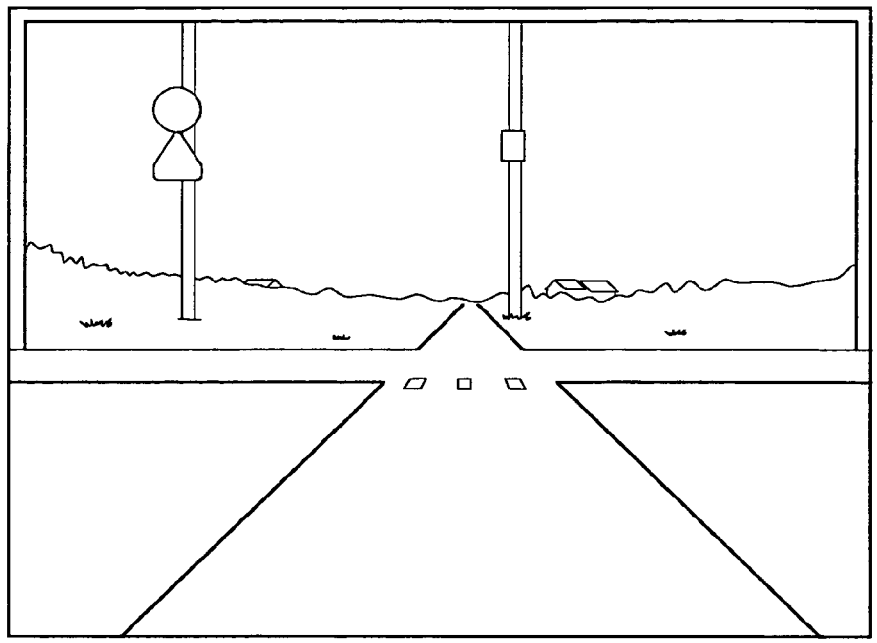
FIGS. 4A, 4B are an image taken by an imaging means and an image outputted by the superposing means.

The imaging means 10 is a camera outputting as image signals the image taken by an imaging element or the like, e.g., being disposed to take an image ahead of the vehicle. Here, the camera is disposed in the vehicle so that it can take a forward image indicating a relationship with a road position, for instance, as shown in FIG. 4A. Namely, a horizon within the image taken is located a little above a center of the vertical direction of the image.

The road detecting means 20 is constituted, for instance, by a micro-computer including a CPU, a ROM, a RAM, an I/O, and a bus line connecting the foregoing. The micro-computer includes a hardware and software (program) for retrieving and processing the image signals outputted from the imaging means 10.

In the road detecting means 20, the pre-treating means 21 receives the image signals outputted from the imaging means 10, emphasizing an edge (i.e., performing edge enhancement) of the image corresponding to the inputted image signals. The pre-treating means 21 is constituted, e.g., by a process by a digital signal processor (DSP) included in the micro-computer; however, it can be also constituted by a process by the CPU that retrieves the image signals into the RAM of the micro-computer.

The road shape storing means 22, e.g., the ROM, stores templates indicating road shapes. The dynamic contour extracting means 23 receives the image signals of the image whose edge is emphasized by the pre-treating means 21 and executes a dynamic contour extraction using SNAKE based on the templates stored in the road shape storing means 22. The dynamic contour extraction is processed by the micro-computer.

The templates stored include, within the control points moved under the dynamic contour extraction by SNAKE, certain control points that are limited in a movement direction (following direction) in consideration of the road shapes. Here, the certain control points are referred to as primary control points. By contrast, the other than the primary control points within all the control points are referred to as secondary control points. The templates stored include geometrical disposition information (initial position information) and following directions of the primary control points. The initial position information is such as positional or connectional relation of the primary control points and secondary control points; the following direction is a direction in which a primary control point is bound (or limited) to be moved, namely, being a restricted direction where a primary control point is moved.

Figure 2A:
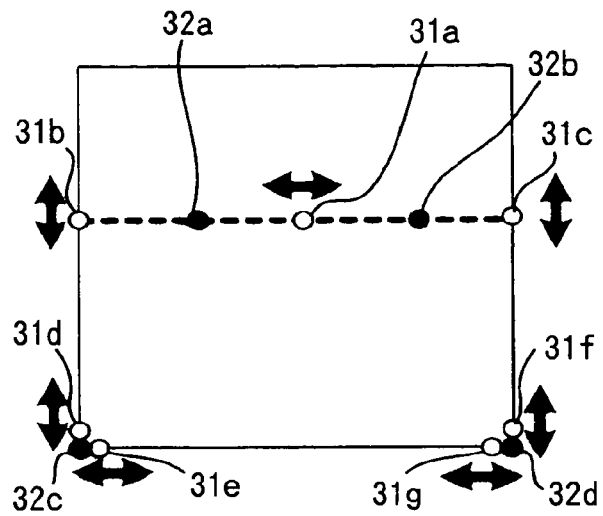
FIGS. 2A to 2C are diagrams showing, as an example of a template, examples of curves and movements of primary control points.
Figure 2B:
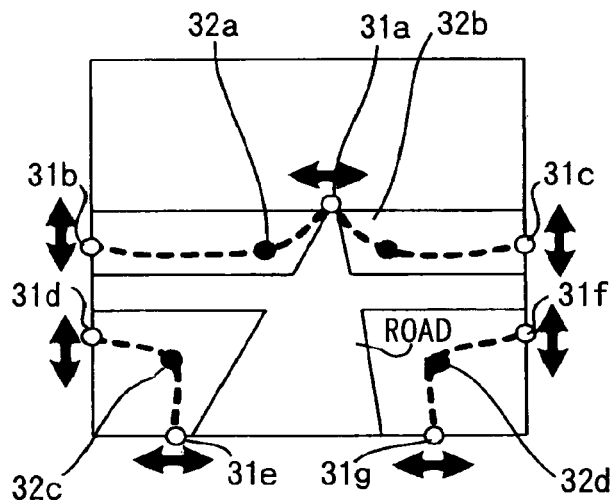
Figure 2C:
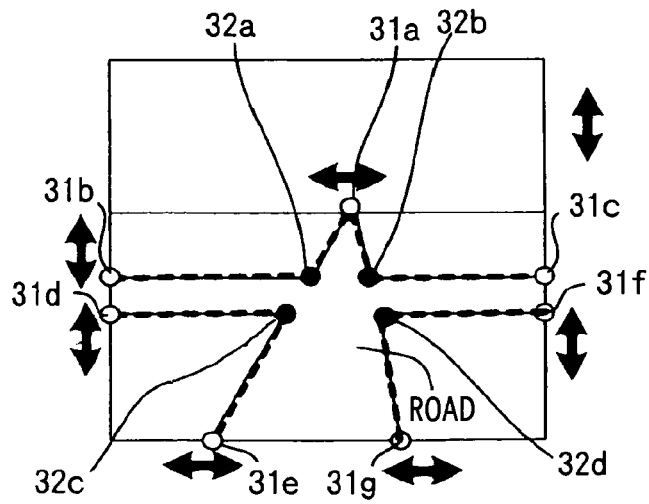

An example of the template stored is shown in FIG. 2A. This template includes primary control points 31a to 31f (open circle (○)), each of which has its initial coordinates as positional disposition information and its following direction as an arrow shown in FIG. 2A (e.g., up and down, left and right). Namely, the primary control points 31a, 31e, 31g have information of the following direction of left and right (horizontal direction) under the dynamic contour detection, while the primary control points 31b, 31c, 31d, 31f, up and down (vertical direction). Further, the primary control points 31a, 31b, 31c have as initial information a Y-coordinate corresponding to a horizontal line in the image taken by the imaging means 10; 31b, an X-coordinate corresponding to the leftmost in the image; 31a, an X-coordinate corresponding to the center in the image; 31c, an X-coordinate corresponding to the rightmost in the image. The primary control points 31d, 31e have as initial information X-Y coordinates corresponding to the leftmost and lowest in the image; 31f, 31g, the rightmost and lowest. (In FIG. 2A, for explanation, points are a little shifted from the accurate locations.) Further, this template has as connectional information four pieces of link information indicating: that the primary control points 31b, 31a are connected with each other via a secondary control point; that the primary control points 31a, 31c are connected with each other via a secondary control point; that the primary control points 31d, 31e are connected with each other via a secondary control point: and that the primary control points 31f, 31g are connected with each other via a secondary control point. Thus, the primary control points include, between them, secondary control points that are the same as the conventional control points. FIGS. 2A to 2C show some secondary control points 32a to 32d (closed circles (●)) of the entire secondary control points.

The dynamic contour extracting means 23 detects, using a dynamic contour extraction method generally known as SNAKE, a contour of a recognition object included in an image by the following steps: a curve with control points is disposed in an image; an internal energy Eint indicating smoothness of the curve, an image energy Eimage indicating a concentration gradient of the image, and an external energy Eext externally coming are summed up; and the curve is modified so that the summed total energy becomes the minimum. Here, the dynamic contour extracting means 23 moves the primary control points based on a template stored in the road shape storing means 22. For instance, when the template shown in FIG. 2A is used, the primary control points 31a to 31g are bound (or limited) to be moved in the following directions shown by the arrows, respectively. By contrast, each of the secondary control points 32a to 32d is moved by following the primary control points which are both ends of the curve including the each of the secondary control points so that the energy function is minimized. For instance, when the pre-treating means 21 inputs the image having such a road as one shown in FIG. 2B, the template shown in FIG. 2A is used; the control points are moved as shown in FIG. 2B and the total energy is eventually minimized in a state shown in FIG. 2C. The modification process for a curve thus takes place. Since the primary control points 31a to 31f are limited in their movement directions such as the vertical or horizontal direction according to the template used, they can be moved at a high speed.

Figure 3:
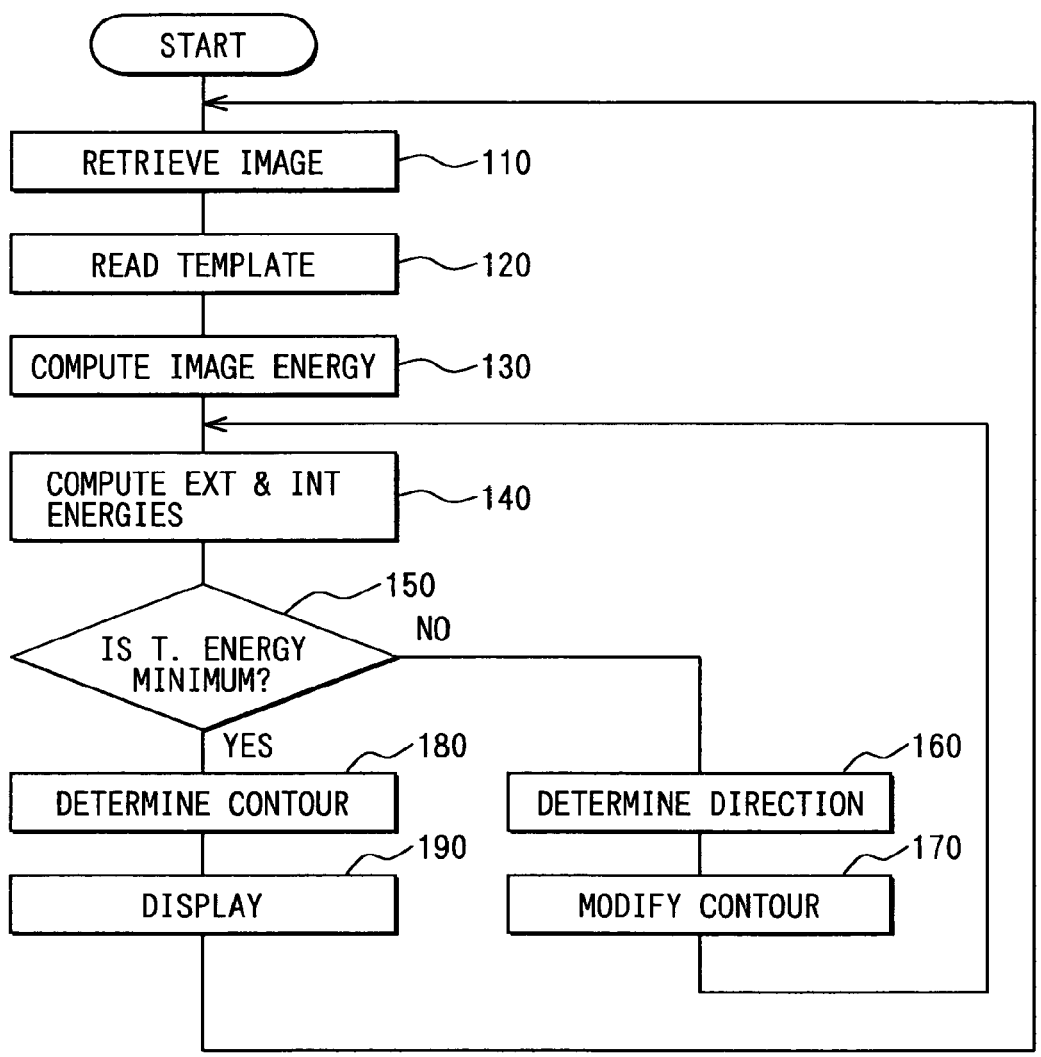
FIG. 3 is a flow chart diagram showing a process as a dynamic contour extracting means and a CG means.

This dynamic contour extraction means 23 and CG means 24 will be explained as a process flow by the micro-computer with reference to FIG. 3.

At Step 110, of the next frame, an image whose edge is emphasized by the pre-treating means 21 is retrieved into a memory. At Step 120, a template stored in the road shape storing means 22 is read out. At Step 130, the image retrieved into the memory is computed in its image energy. At Step 140, the image is further computed in its external energy and internal energy to obtain a total energy of the image, external, and internal energies. At Step 150, it is determined whether the total energy is the minimum. When the total energy is determined to be not the minimum (Step 150: NO), the process moves to Step 160 where the primary and secondary control points are determined in their movement directions for minimizing the total energy. Here, the primary control points are determined in their movement directions which are within the limited following directions. For instance, when the template shown in FIG. 2A is used, the movement directions of the primary control points 31a, 31e, 31g are determined to be limited to either leftward or rightward; 31b, 31c, 31d, 31f, either upward or downward. At Step 170, the dynamic contour modification of moving the control points for minimizing the total energy is executed by following the movement directions determined at Step 160, which then returns the process to Step 140. Here, for instance, the control points are moved as shown in FIG. 2B. The foregoing modification is repeated so that the position enabling the total energy to be minimized is determined. For instance, the control points are moved as shown in FIG. 2C.

Next, at Step 150, when the total energy is determined to be the minimum (Step 150: YES), the process advances to Step 180 where current positions of the primary and secondary control points are determined as contours detected. At Step 190, the contours detected are combined to form computer graphics to be outputted to the superimposing means 25. The process then returns to Step 110 and repeats the above.

Figure 4B:
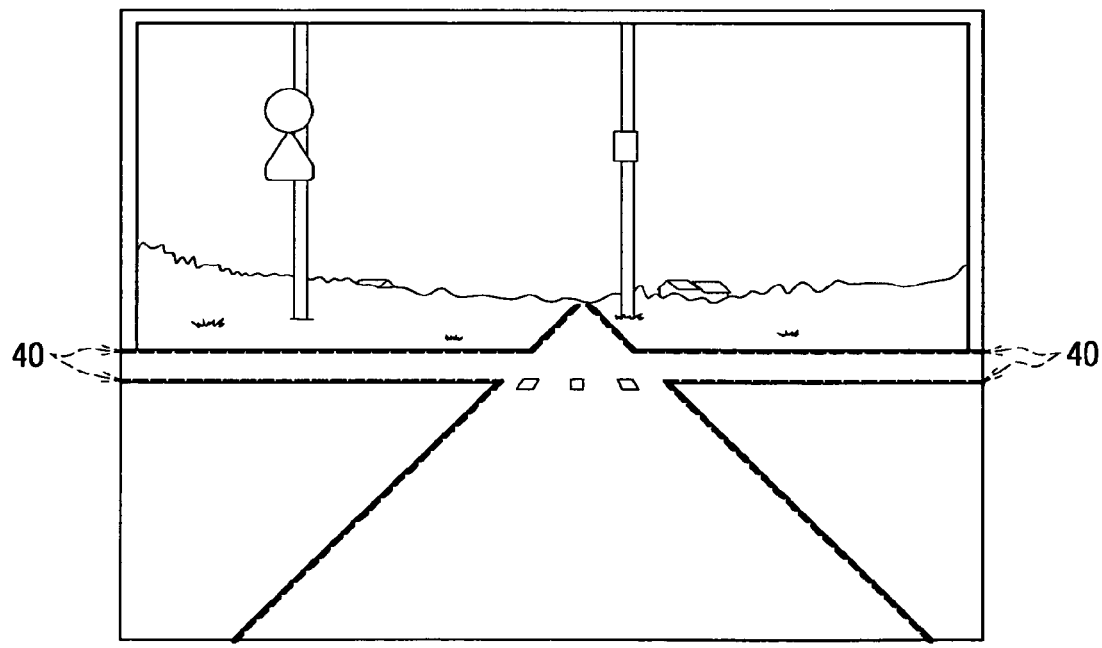

The superimposing means 25 superimposes the computer graphics formed at Step 190 on the image taken by the imaging means 10, outputting to the display. For instance, the superimposing means 25 retrieves the image shown in FIG. 4A taken by the imaging means 10, superimposes, on the image shown, the dotted lines 40 of computer graphics formed by combining the contours at Step 190. The image with the computer graphics superimposed is displayed as shown in FIG. 4B. A driver can thereby recognize the road position on the display.

As explained above, a template for indicating a road shape is prepared; the template is treated as an initial state in the dynamic contour extraction; primary control points that are strictly bound to be moved only in a vertical or horizontal direction are provided within control points in the template; the primary control points are moved according to the restricted directions; and in movement of the control points using SNAKE the primary control points can be thereby determined in their positions at a high speed. Furthermore, secondary control points move based on the energy function and the primary control points, which enables the determination at a high speed of the positions of the control points. Here, that a matching is performed based on positional relations of the constituents, instead of shapes themselves, is referred to as a topology matching. Namely, in this embodiment, the control points can be determined in their positions at a high speed through the topology matching. Further, a template stores data based on a road shape, so that a road position is more properly detected than conventional. Furthermore, this method can extract a contour even in an open curve (or open curved surface), unlike known SNAKE.

Figure 5A:
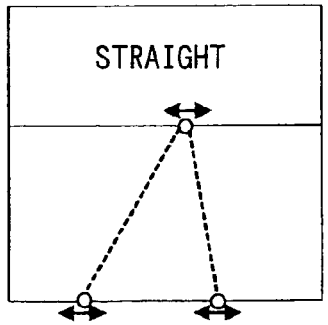
FIGS. 5A to 5H are diagrams showing templates based on multiple road shapes stored in a road shape storing means.
Figure 5B:
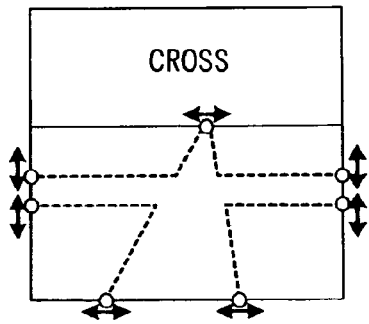
Figure 5C:
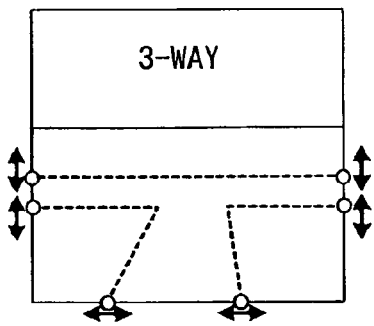
Figure 5D:
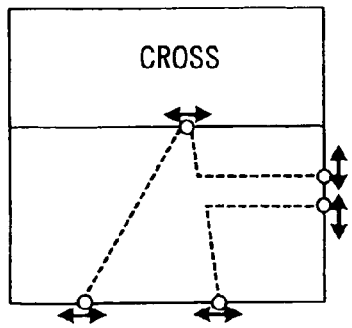
Figure 5E:
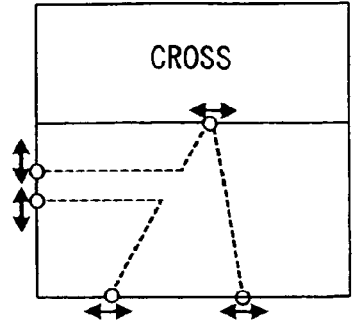
Figure 5F:
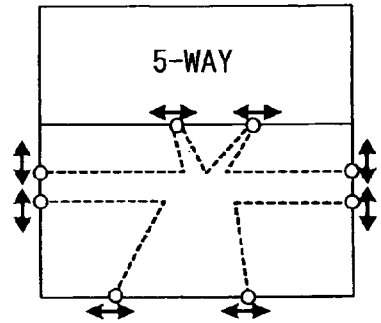
Figure 5G:
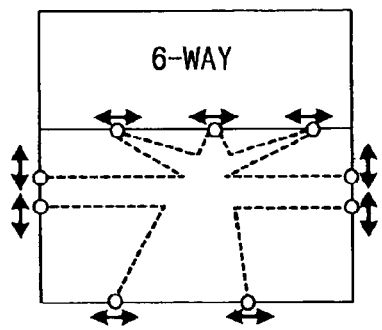
Figure 5H:
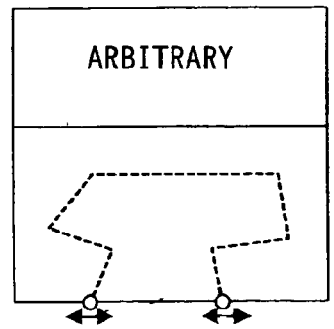
Figure 6:
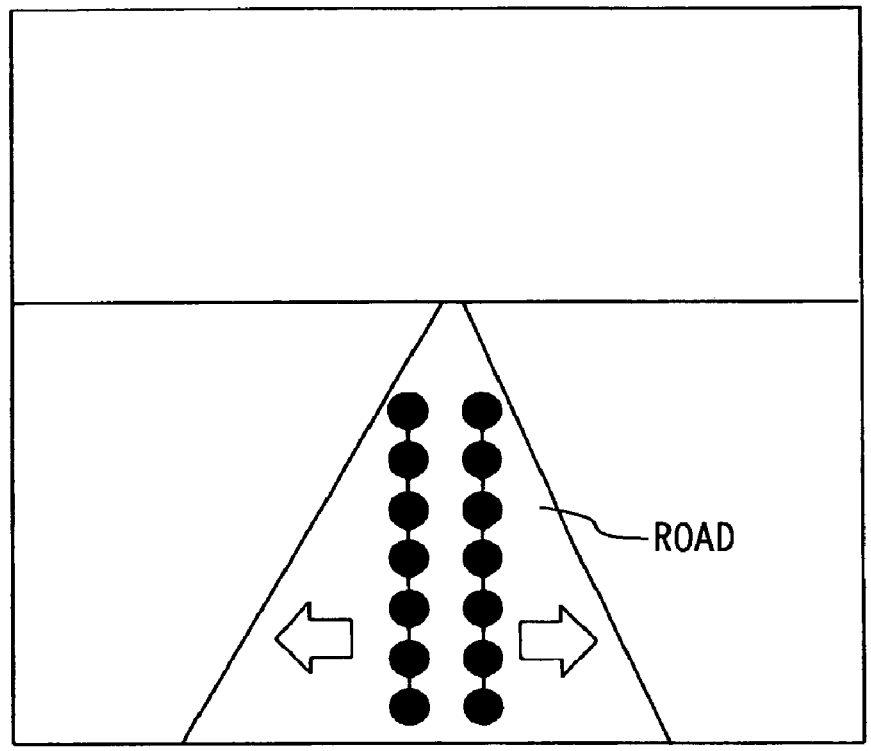
FIG. 6 is a diagram showing a road shape detection method of a related art.

In addition, the road shape storing means 22 can store, according to a road shape, templates of multiple patterns shown in FIGS. 5A to 5H. For instance, FIG. 5A shows a template of a straight road; FIGS. 5B to 5G, various intersections (T-shaped intersection, cross, n-way-intersection); and FIG. 5H, an arbitrary shape. The dynamic contour extracting means 23 can select the most appropriate template from among these templates. For instance, all the templates shown in FIGS. 5A to 5H can be used for determining as a contour the control points included in a template that minimizes the total energy function. Otherwise, instead of all the templates, templates from among all the templates shown in FIGS. 5A to 5H can be sequentially used one by one. Here, when a predetermined minimal threshold value of the total energy is reached or exceeded by using a given template, the control points of the given template are determined to be a contour of the road position.

Using the multiple templates enables appropriate recognition of the various road shapes at a high speed. Further, the road shape storing means 22 can store templates by associating the templates with respective priority orders determined according to a distribution of the actual road shapes. The dynamic contour extracting means 23 then uses the templates one by one in the priority order for extracting the contour, which results in averagely high-speed detection of the road position.

Further, a navigation system can be provided as a road data retrieving means for retrieving road data around the current position. Based on the road data retrieved by the navigation system, the dynamic contour extracting means 23 can determine a template to the extraction from among the templates, e.g., shown in FIGS. 5A to 5H. This enables detecting as a road position a resulting contour from the template being more similar to an actual road.

Further, the dynamic contour extracting means 23 can preferentially select the template that is most recently used in the preceding frame for determining a contour. For instance, the template used in the preceding frame is designed to be first used in the next frame. In particular, continuous detection of the road position decreases change of the template, so that using the preceding template results in high-speed detection of the road position.

Further, for instance, a template preferably sets an initial position of a primary control point within lower half portion of the image, namely an area of the image located below the center of the vertical line within the image.

Further, when the dynamic contour extracting means 23 cannot extract the contour using all the templates, the image alone can be displayed.

Further, the imaging means 10 takes an image ahead of the vehicle in this embodiment; however, it can also take an image backward of the vehicle, or an image sideward of the vehicle.

Further, the road detecting means 20 is constructed of a micro-computer and software in this embodiment; however, it can be constructed of a hardware other than the micro-computer.

Additionally, when a method or a device for detecting a road position is achieved by a computer, for instance, it can be achieved by a program executed by the computer. The program is, for instance, stored in a computer-readable medium such as a flexible disk, an optical magnetic disk, a CD-ROM, a hard disk, a ROM, a RAM, etc. and executed as needed by being downloaded into the computer. The program is also executed by being downloaded via a network.

It will be obvious to those skilled in the art that various changes may be made in the above-described embodiments of the present invention. However, the scope of the present invention should be determined by the following claims.

What is claimed is:

1. A device for detecting a road position included in an image, comprising:
    dynamic contour extracting means comprising a processor configured for
        disposing a curve with control points on the image;
        summing up an internal energy indicating smoothness of the curve, an image energy indicating a concentration gradient of the image, and an external energy externally coming so as to obtain a total energy,
        modifying the curve by moving the control points so that the obtained total energy becomes a minimum, and
        extracting a contour of a recognition object included in the image;
    detecting means for detecting the contour extracted as the road position included in the image;
    imaging means for taking the image, the imaging means being configured to be disposed in a vehicle so that the image includes a horizon that is seen while the vehicle travels; and
    storing means for storing a template including, inside horizontal (peripheral) boundaries and vertical (peripheral) boundaries of the template, a horizontal line corresponding to the horizon included in the taken image,
    the template being provided with the control points, which include primary control points and secondary control points that are other than the primary control points,
    the template including information indicating that each of the primary control points is bound to be moved based on a road shape only in one of (i) the horizontal (peripheral) boundary, (ii) the vertical (peripheral) boundary, and (iii) the horizontal line,
wherein, when the dynamic contour extracting means moves the control points including the primary control points and the secondary control points based on the template stored so as to minimize the total energy, the primary control points are bound to be moved based on the information.

2. The device for detecting the road position of claim 1, further comprising:
pre-treating means for forming the image by emphasizing an edge of an inputted image.

3. The device for detecting the road position of claim 1,
wherein the storing means stores a plurality of templates corresponding to respective road shapes to be assumed,
wherein the dynamic contour extracting means extracts contours using the respective templates stored in the storing means, and
wherein the detecting means detects as the road position the contour from among the contours, wherein a total energy of the contour detected by the detecting means is minimum among total energies of the contours.

4. The device for detecting the road position of claim 3,
wherein the storing means stores the plurality of templates in a priority order determined based on a distribution of actual road shapes, and
wherein the dynamic contour extracting means extracts the contour using the template, in the priority order, sequentially selected from among the plurality of templates stored in the storing means.

5. The device for detecting the road position of claim 3, further comprising:
road data retrieving means for retrieving road data around a current position,
wherein the dynamic contour extracting means selects a given template from among the plurality of templates based on the road data retrieved by the road data retrieving means and extracts the contour using the given template.

6. The device for detecting the road position of claim 3,
wherein the dynamic contour extracting means extracts the contour preferentially using the template that is used in most recently detecting the road position.

7. The device for detecting the road position of claim 3,
wherein the storing means stores the template including primary control points whose initial points are disposed within lower half portion of the image.

8. The device for detecting the road position of claim 3,
wherein the storing means stores the template based on the road shape of at least one of a straight road, an n-way-intersection, and an arbitrary road shape.

9. The device for detecting the road position of claim 1,
wherein the storing means stores a plurality of templates corresponding to respective road shapes to be assumed,
wherein, the dynamic contour extracting means extracts the contour using a template sequentially selected from among the plurality of templates stored in the storing means, and
wherein the detecting means detects as the road position the contour whose total energy first falls within a range of not more than a predetermined value.

10. The device for detecting the road position of claim 9,
wherein the storing means stores the plurality of templates in a priority order determined based on a distribution of actual road shapes, and
wherein the dynamic contour extracting means extracts the contour using the template, in the priority order, sequentially selected from among the plurality of templates stored in the storing means.

11. The device for detecting the road position of claim 9, further comprising:
road data retrieving means for retrieving road data around a current position,
wherein the dynamic contour extracting means selects a given template from among the plurality of templates based on the road data retrieved by the road data retrieving means and extracts the contour using the given template.

12. The device for detecting the road position of claim 9,
wherein the dynamic contour extracting means extracts the contour preferentially using a template that is used in most recently detecting the road position.

13. The device for detecting the road position of claim 9,
wherein the storing means stores the template including primary control points whose initial points are disposed within lower half portion of the image.

14. The device for detecting the road position of claim 9,
wherein the storing means stores the template based on the road shape of at least one of a straight road, an n-way-intersection, and an arbitrary road shape.

15. The device for detecting the road position of claim 1, further comprising:
display controlling means for displaying the image on which computer graphics are superimposed, wherein the computer graphics are formed by processing the road position detected by the road position detecting means.

16. The device for detecting the road position of claim 15,
wherein the display controlling means displays the image alone when the dynamic contour extracting means cannot extract the contour even using the template.

17. The device according to claim 1, wherein
when the dynamic contour extracting means moves the control points including the primary control points and the secondary control points based on the template stored so as to minimize the total energy, each of the secondary control points being moved by following the primary control points which are both ends of the curve including the each of the secondary control points.

18. A program storage medium containing instructions readable and executable by a computer, the instructions including a method for detecting a road position included in an image, the instructions for implementing the steps of:
disposing a curve with control points on the image, wherein the control points include (i) primary control points, each of the primary control points being bound to be moved only in one of a horizontal direction and a vertical direction based on a road shape, and (ii) secondary control points that are other than the primary control points;
summing up an internal energy indicating smoothness of the curve, an image energy indicating a concentration gradient of the image, and an external energy externally coming so as to obtain a total energy;
modifying the curve by moving the control points so that the obtained total energy becomes a minimum;
extracting a contour of a recognition object included in the image;
detecting the contour extracted as the road position included in the image;
taking the image from an imaging means configured to be disposed in a vehicle so that the image includes a horizon that is seen while the vehicle travels; and storing a template including information including one of the horizontal direction and the vertical direction in which each of the primary control points is bound to be moved, inside horizontal (peripheral) boundaries and vertical (peripheral) boundaries of the template, a horizontal Fine corresponding to the horizon included in the taken image, the template being provided with the control points, which include primary control points and secondary control points that are other than the primary control points, the template including information indicating that each of the primary control points is bound to be moved based on a road shape only in one of (i) the horizontal (peripheral) boundary, (ii) the vertical (peripheral) boundary, and (iii) the horizontal line, wherein, when the control points including the primary control points and the secondary control points are moved based on the template stored so as to minimize the total energy, the primary control points are bound to be moved based on the information.

19. The device for detecting the road position of claim 1, each of the primary control points on the horizontal (peripheral) boundaries of the template being bound to be moved only in the horizontal (peripheral) boundaries, each of the primary control points on the vertical (peripheral) boundaries being bound to be moved only in the vertical (peripheral) boundaries.

\* \* \* \* \*